May 26, 1970  A. G. RAYMENT  3,513,956
FEEDING DEVICE FOR ELONGATED OBJECTS
Filed Sept. 11, 1967
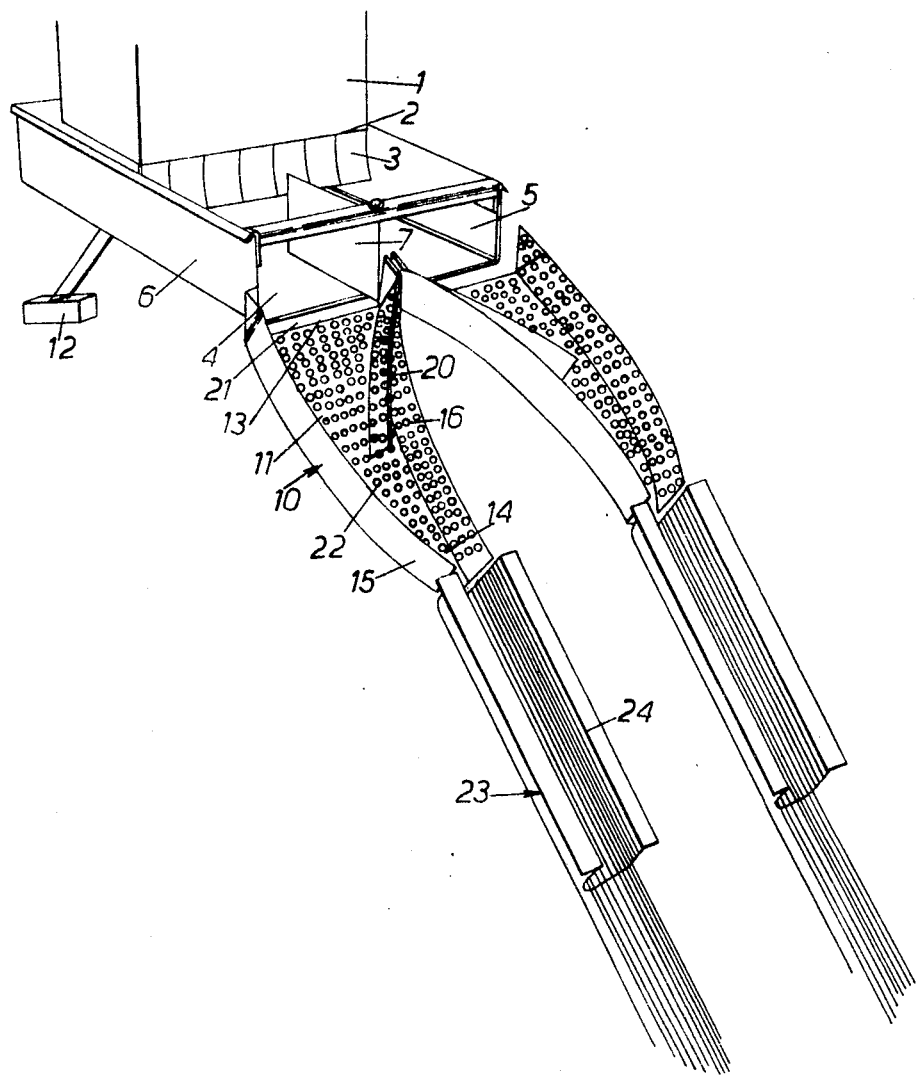
Inventor
Arthur George Rayment
By
Cushman, Darby & Cushman
Attorneys United States Patent Office 3,513,956
Patented May 26, 1970

3,513,956
FEEDING DEVICE FOR ELONGATED OBJECTS
Arthur G. Rayment, Bromley Common, Kent, England, assignor to Gunson's Sortex Limited, London, England, a British company
Filed Sept. 11, 1967, Ser. No. 666,673
Claims priority, application Great Britain, Sept. 27, 1966, 43,200/66
Int. Cl. B65g 11/20
U.S. Cl. 193—43
8 Claims

ABSTRACT OF THE DISCLOSURE

A feed tray is mounted at an angle to the horizontal and has a relatively wide upper end and a relatively narrow lower end, the fed tray having upstanding side walls which converge towards the lower end. A guide member is mounted obliquely above an upper portion of the feed tray and extends substantially throughout the width of the upper end, the guide member being arranged to deflect objects, which have been supplied to the upper end, towards one of the side walls so that the objects are orientated by and slide down the latter, one at a time, towards the lower end.

---

This invention concerns a feeding device for orientating elongated objects and feeding them, one at a time, to a point of use.

Thus although the invention is not so restricted, it is more particularly concerned with orientating elongated objects such for example as un-fried potato chips and feeding them to a sorting machine in which those chips with eyes or other blemishes can be separated from the remaining chips.

According to the present invention, there is provided a feeding device for orientating elongated objects and feeding them one at a time to a point of use comprising an elongated feed tray which is mounted at an angle to the horizontal and which has a relatively wide upper end and a relatively narrow lower end, the fed tray having upstanding side walls which converge toward the said lower end, and a guide member which is mounted obliquely above an upper portion of the feed tray and which extends substantially throughout the width of the said upper end, the guide member being arranged to deflect objects, which have been supplied to the said upper end, towards one of the said side walls so that the objects are orientated by and slide down the latter, one at a time, towards the said lower end.

The guide member is preferably a resilient strip member which is fixed at its upper end only. Thus the upper end of the guide member may be fixed to the other side wall.

The said one side wall is preferably of arcuate shape, the said upper and lower ends being axially aligned.

The surfaces of the feed tray and guide member which are engagable by the objects are preferably formed with protuberances to diminish surface contact between the said surfaces and the objects. Moreover, the surfaces of the fed tray and guide member which are engagable by the objects are preferably formed of material having a low coefficient of friction.

The fed tray is preferably mounted at an angle of 50° to 70° to the horizontal.

The feeding device may also comprise a feed channel which is mounted above the upper end of the feed tray and is adapted to supply the latter with unorientated elongated objects. Thus, the feed channel is preferably spaced from the said upper end by a vertical gap.

Means may be provided for vibrating the feed channel to cause objects therein to pass to the feed tray.

The feeding device may additionally comprise a delivery chute which is mounted at an angle to the horizontal and whose upper end is arranged to receive objects from the lower end of the feed tray.

The width of the delivery chute preferably diminishes towards its lower end.

The invention also comprises a sorting machine for separating desired from undesired objects, the said machine being provided with a feeding device as set forth above.

The invention is illustrated, merely by way of example, in the accompanying drawing which shows a diagrammatic perspective view of a feeding device according to the present invention.

Referring to the drawing, a feeding device for feeding unfried potato chips (not shown) to a sorting machine (not shown) comprises a hopper 1 which is adapted to contain a mass of un-orientated chips. The bottom of the hopper 1 has an opening 2 through which the chips may leave the hopper 1, the opening 2 being closed by strips 3 of rubber or other flexible material which are secured to the hopper 1 at their upper ends.

Chips which pass through the opening 2 may enter one or other of adjacent feed channels 4, 5, in a tray 6, the feed channels 4, 5 being separated from each other by a wall 7.

Mounted beenath each of the feed channels 4, 5 is an elongated feed tray 10 having a surface 11 which is mounted at an angle of 50° to 70° to the horizontal.

An electro-magnetic or other vibrator 12 is provided to cause vibration of the tray 6 so that chips in the feed channels 4, 5 are caused to pass to the upper ends 13 of the feed trays 10.

Each of the feed trays 10 has a lower end 14 which is axially aligned with, but is substantially narrower than, its upper end 13. Each feed tray 10 has arcuate upstanding side walls 15, 16, which extend from its upper end 13 to its lower end 14 and which thus converge towards the lower end 14.

Each of the feed trays 10 has a guide member 20 mounted obliquely above an upper portion of the feed tray. Each guide member 20 is constituted by a resilient strip member which is fixed at its upper end to the respective side wall 16, but is free to move throughout the rest of its length. Each guide member 20 extends substantially throughout the width of the upper end 13 of its feed tray, and thus throughout the width of its respective feed channel 4, 5.

The arrangement is such that as the chips enter the upper end of the feed tray 10, they strike the guide member 20 which deflects them toward the side wall 15 and in so doing at least partially orientates them. Orientation of the chips is completed after the latter have been deflected by the guide member 20 onto the side wall 15 since the chips slide down the latter, one at a time, towards the lower end 14 of the feed tray.

In order to promote spacing between successive chips which leave the feed channels 4, 5, the latter are spaced from the upper ends 13 of their respective feed trays 10 by vertical gaps 21.

At least those surfaces of the feed tray 10 and guide member 20 which are engageable by the chips are formed with protuberances 22 to diminish surface contact between the said surfaces and the chips. Moreover, the said surfaces are preferably formed of material such as polytetrafluorethylene having a low co-efficient of friction. Thus the feed trays 10 may be formed of steel and covered with polytetrafluorethylene. If desired, the feed channels 4, 5 may be similarly formed.

Disposed below and adjacent the lower end 14 of each of the feed trays 10 is a delivery chute 23 which is mounted at an angle of say 70° to a horizontal. The upper end of each of the delivery chutes 23 is adapted to receive the chips from the lower end 14 of the respective feed tray 10. Each of the delivery chutes 23 has a width which diminishes toward its lower end.

Each of the delivery chutes 23 may have longitudinally extending ribs 24 to diminish surface contact with the chips, and may be formed of aluminium which has been coated with a low friction material such as polytetrafluorethylene.

From the lower end of the delivery chutes 23 the chips pass to an electronic colour sorting machine, e.g. that disclosed in our U.S. Pat No. 3,066,797, in which those chips which have eyes or other blemishes therein may be separated from the remainder.

I claim:

1. A feeding device for orientating elongated objects and feeding them one at a time to a point of use, comprising an elongated feed tray which is mounted at an angle to the horizontal and which has a relatively wide upper end and a relatievly narrow lower end, the feed tray having upstanding side walls which converge toward the said lower end, and a guide member in the form of a resilient strip member which is mounted obliquely above an upper portion of the feed tray and which extends substantially throughout the width of the said upper end, the guide member being fixed at its upper end only and arranged to deflect objects, which have been supplied to the said upper end, toward one of the said side walls and causing the objects to be orientated by and slide down the latter, one at a time, toward the said lower end.

2. A feeding device as claim in claim 1 in which the upper end of the guide member is fixed to the other side wall.

3. A feeding device as claimed in claim 1 in which the said one side wall is of arcuate shape, the said upper and lower ends being axially aligned.

4. A feeding device as claimed in claim 1 in which the surfaces of the feed tray and guide member which are engageable by the objects are formed with protuberances which diminish surface contact between the said surfaces and the objects.

5. A feeding device as claimed in claim 1 in which the surfaces of the feed tray and guide member which are engageable by the objects are formed of material having a low coefficient of friction.

6. A feeding device as claimed in claim 1 in which the feed tray is mounted at an angle of 50° to 70° to the horizontal.

7. A feeding device for orientating elongated objects and feeding them one at a time to a point of use, comprising an elongated feed tray which is mounted at an angle to the horizontal and which has a relatively narrow lower end, the upper and lower ends being axially aligned, the feed tray having upstanding side walls which converge toward the said lower end, one of said side walls being of arcuate shape, and a guide member which is mounted obliquely above an upper portion of the feed tray and which extends substantially throughout the width of the said upper end, the guide member being arranged to deflect objects, which have been supplied to the said upper end, toward said one of the said side walls and causing the objects to be orientated by a slide down the latter, one at a time, toward the said lower end.

8. A feeding device for orientating elongated objects and feeding them one at a time to a point of use, comprising an elongated feed tray which is mounted at an angle of 50° to 70° to the horizontal and which has a relatively wide upper end and a relatively narrow lower end, the feed tray having upstanding side walls which converge toward the said lower end, and a guide member which is mounted obliquely above an upper portion of the feed tray and which extends substantially throughout the width of the said upper end, the guide member being arranged to deflect objects, which have been supplied to the said upper end, towards one of the said side walls and causing the objects to be orientated by and slide down the latter, one at a time, toward the said lower end.

References Cited

UNITED STATES PATENTS

| | | | |
|---|---|---|---|
| 1,893,903 | 1/1933 | Mullins. | |
| 2,174,716 | 10/1939 | Bethell | 193—2 |
| 2,815,252 | 12/1957 | Baker | 193—2 |

ANDRES H. NIELSEN, Primary Examiner